United States Patent [19]

Chen

[11] Patent Number: 5,182,858
[45] Date of Patent: * Feb. 2, 1993

[54] RAZOR MECHANISM

[75] Inventor: Evan N. Chen, Fairfield, Conn.

[73] Assignee: Warner-Lambert Company, Morris Plains, N.J.

[*] Notice: The portion of the term of this patent subsequent to Sep. 3, 2008 has been disclaimed.

[21] Appl. No.: 600,290

[22] Filed: Oct. 15, 1990

Related U.S. Application Data

[63] Continuation of Ser. No. 361,454, Jun. 5, 1989, abandoned.

[51] Int. Cl.⁵ .............................................. B26B 21/14
[52] U.S. Cl. .......................................... 30/85; 30/49; 30/51
[58] Field of Search .................. 30/49, 85, 340, 331, 30/50, 51, 67, 68

[56] References Cited

U.S. PATENT DOCUMENTS

| | | | |
|---|---|---|---|
| 4,069,580 | 1/1978 | Cartwright et al. | 30/47 |
| 4,266,340 | 5/1981 | Bowman | 30/50 X |
| 4,443,939 | 4/1984 | Motta et al. | 30/49 |
| 4,459,744 | 7/1984 | Esnard | 30/49 |
| 4,516,320 | 5/1985 | Peleckis | 30/49 |
| 4,754,548 | 7/1988 | Solow | 30/50 |
| 4,797,998 | 1/1989 | Motta | 30/85 X |
| 4,922,609 | 5/1990 | Grange | 30/89 X |
| 5,044,077 | 8/1991 | Ferraro et al. | 30/85 |

Primary Examiner—Frank T. Yost
Assistant Examiner—Rinaldi Rada
Attorney, Agent, or Firm—Richard S. Bullitt

[57] ABSTRACT

A razor mechanism particularly suited for use with a flexible cartridge having at least one attachment member moveable in a direction substantially perpendicular to the longitudinal axis of the razor mechanism in response to the flexing of the razor cartridge during shaving.

19 Claims, 15 Drawing Sheets

RAZOR MECHANISM

This is a continuation of copending application Ser. No. 361,454 filed on Jun. 5, 1989, now abandoned.

BACKGROUND OF THE INVENTION

The present invention is directed to a razor mechanism and, more particularly, to a razor mechanism especially adapted to support a flexible razor cartridge.

Many types of razor mechanisms are known in the art. Razor mechanisms are typically designed to securably support a cartridge containing at least one razor blade at the ends and at least one midpoint of the cartridge.

Among the various types of razor mechanisms known in the art are the channel-type razors which typically have two fixed opposing bars adapted to slidably receive a cartridge having a corresponding fixed track. Such channel-type razors provide support to a cartridge along the entire longitudinal length of the cartridge. An example of a "dynamic" cartridge, i.e. a cartridge having a changeable blade geometry having a track for such support is shown in U.S. Pat. No. 4,516,320 to Peleckis.

Another type of razor known in the art includes a spring actuated grasping members which, upon the application of force to an actuator button, moves two spring actuated grasping members inwardly or outwardly. After the cartridge has been properly positioned on the razor handle, the actuator button is released allowing the grasping members to return to their non-biased position and thereby grasp the razor cartridge. Such pivoting-type razors have been designed to either maintain the razor cartridge fixed with respect to the razor handle or, are of the "pivoting" type, which allow the cartridge to pivot on the razor during shaving. An improved razor which allows the cartridge to pivot or to be locked in a non-pivoting manner is disclosed in U.S. Pat. No. 4,797,998 which issued to Motta on Jan. 17, 1989 entitled Lockable Pivotable Razor.

The attaching mechanisms of the razors known in the prior art have generally been designed to remain in fixed lateral positions while the razor is in use. For example, U.S. Pat. No. 4,069,580 to Cartwright et al. which reissued as U.S. Pat. No. 30,913 discloses a flexible blade cartridge wherein the cartridge is supported on fixed pins of the shaving handle head. Another support for a flexible blade cartridge is disclosed in U.S. Pat. No. 4,443,939 to Motta et al.

In order to provide a closer shave, a new type of flexible razor cartridge has recently been developed. This new flexible razor head, disclosed in co-pending U.S. patent application Ser. No. 115,781, filed on Oct. 30, 1987 which is hereby incorporated by reference, comprises a flexible cartridge which is designed to bend along its longitudinal axis during shaving. From the description in that patent application, it will be appreciated by those skilled in the art that when the razor cartridge bends along its longitudinal axis, the linear distance between the ends of the cartridge decreases. Since the attachment mechanisms of razors known in the art have been conventionally designed to remain in fixed positions except when the cartridge is being attached or detached from the razor, such conventional handles would either not permit the desired bending of the flexible-type cartridges or, if such bending was permitted, would create the risk that the cartridge becomes dislodged from the razor mechanism.

Additionally, razor mechanisms known in the art for flexible cartridges require the flexing of the razor cartridges when the cartridge is being attached to the razor mechanism. It would be very desirable to eliminate the danger inherent in the handling of a cartridge containing sharp blades especially when such handling requires the bending of a flexible cartridge which could slip and injure the person assembling the cartridge on the razor mechanism.

In light of the relatively new flexible-type cartridge design, it is also desirable to provide a razor mechanism wherein the attaching mechanism will securably connect a flexible cartridge to the razor handle while permitting the cartridge to bend during shaving. It would be especially advantageous to provide a razor mechanism which gives additional support to a flexible cartridge when the cartridge is in a flexed position.

BRIEF DESCRIPTION OF THE INVENTION

The present invention comprises a razor mechanism having attachment ends which are slidable in a lateral direction in response to the bending of a flexible cartridge during shaving. The razor mechanism preferably comprises a housing, an actuator and at least one attachment member. The actuator is slidably connected to the housing and has at least one prong member which engages the attachment member. The attachment member is partially disposed within the housing and has an attachment end for engagement with a flexible cartridge in a manner which provides moveable support to the cartridge when the cartridge is flexed during shaving.

DETAILED DESCRIPTION

As shown in FIGS. 1-14, razor mechanism 10 of one embodiment of the present invention comprises a housing 50, an attachment member 200, and an actuator 150. The razor mechanism 10, is adapted to be attached to a handle extension (not shown).

Figure 1:
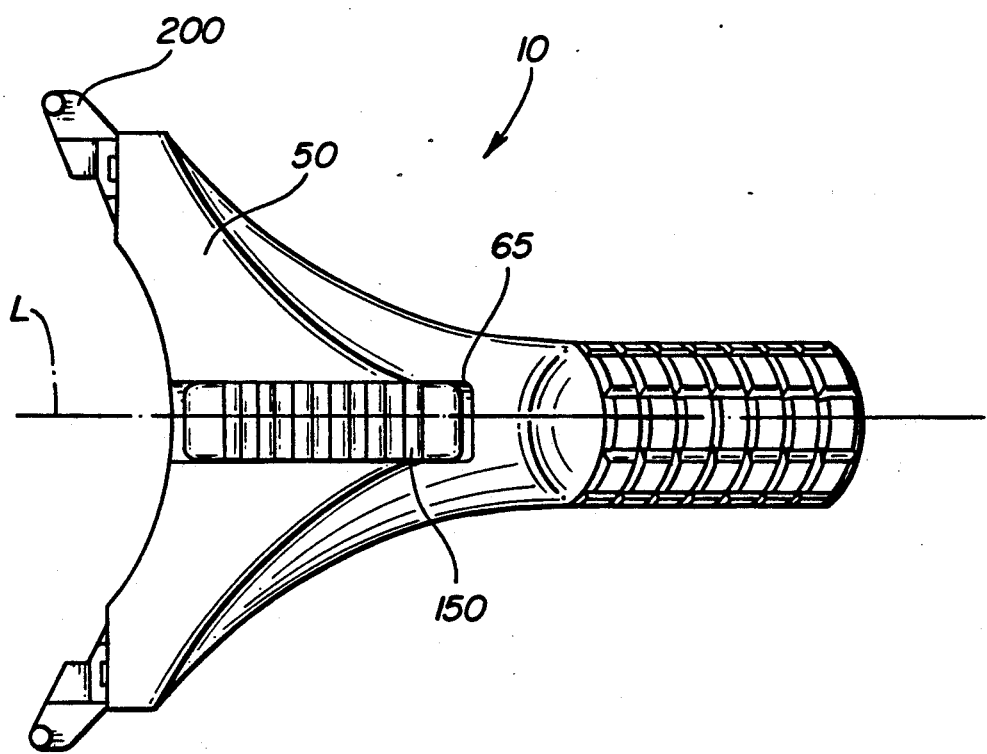
FIG. 1 is a top view of the razor mechanism of one embodiment of the present invention.
Figure 2:
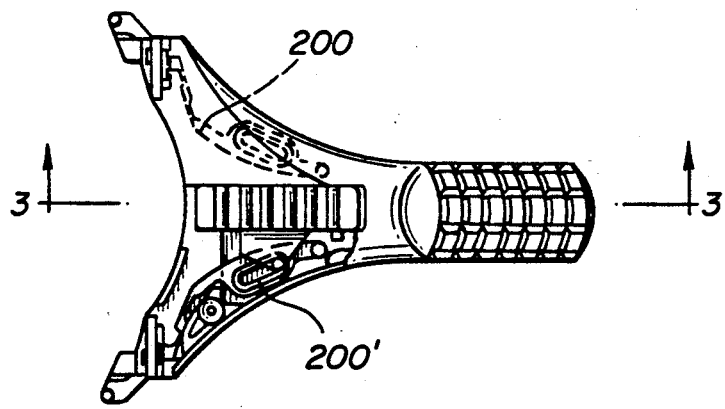
FIG. 2 is a top view of one embodiment of the present invention with sections removed.
Figure 3:
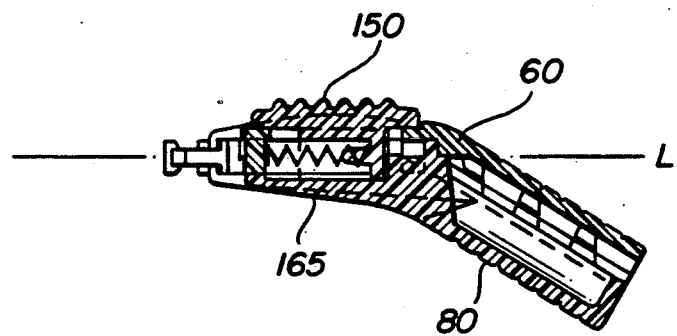
FIG. 3 is a cross-sectional side view of the razor mechanism of FIG. 2 taken along lines 3—3.
Figure 4:
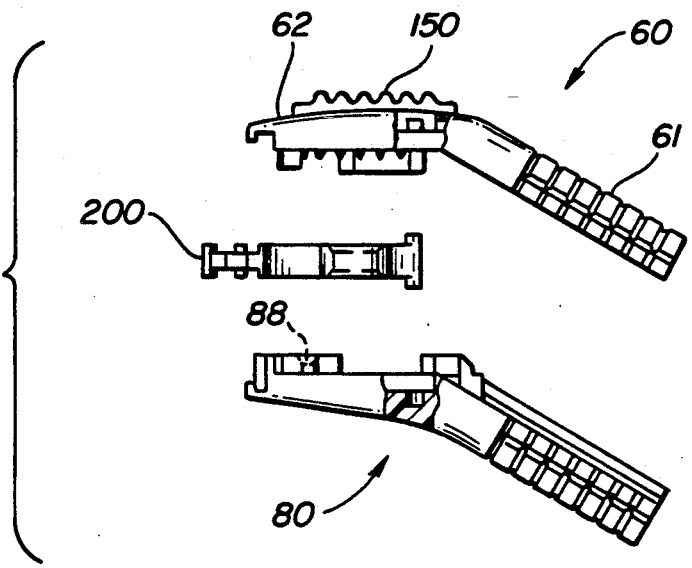
FIG. 4 is an exploded, side-view of the razor mechanism of the present invention illustrated in FIGS. 2 and 3.

With reference to FIGS. 2-4, in one embodiment of the present invention, housing 50 comprises a top cover 60 and a bottom frame 80. FIG. 2 has sections removed to illustrate the coooperative arrangement of attachment members 200 and 200', and actuator 150 which is biased in the proximal direction by spring 165. Top cover 60 comprises a gripping portion 61 and a control portion 62. Control portion 62 has a central longitudinal axis L. Gripping portion 61 may be designed to have any desirable cross section, for example cylindrical, and is preferably knurled to facilitate gripping by the person shaving. FIG. 4 which is an exploded view of this embodiment generally illustrates the relationship between top cover 60, bottom frame 80 and attachment member 200 which are described in further detail below.

Figure 5:
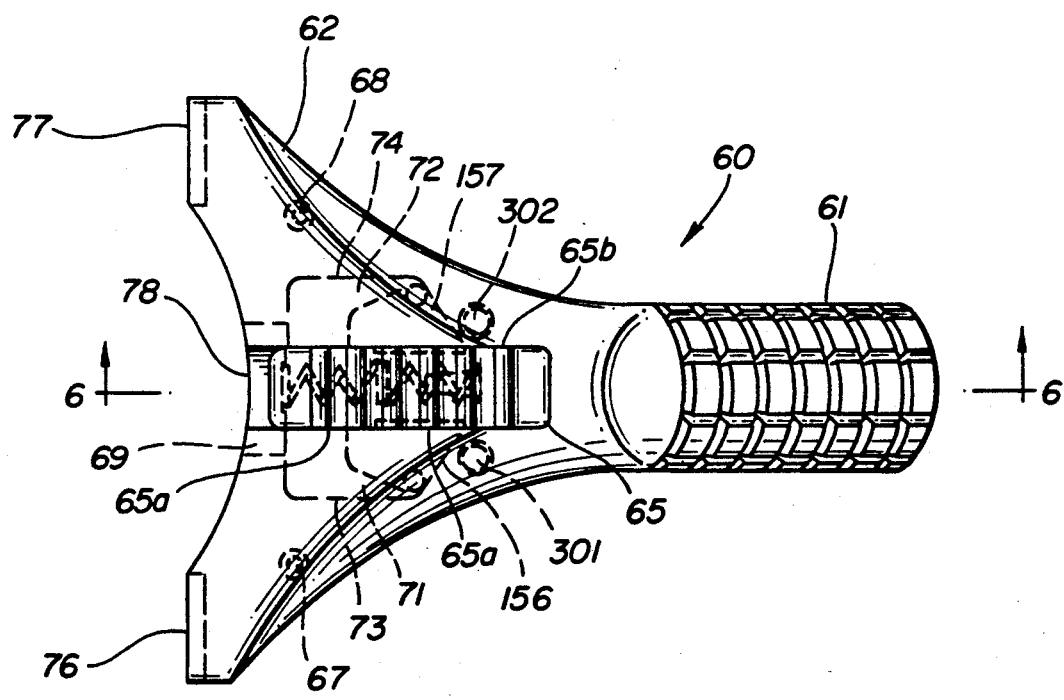
FIG. 5 is a top view of a top cover assembly of one embodiment of the present invention.
Figure 6:
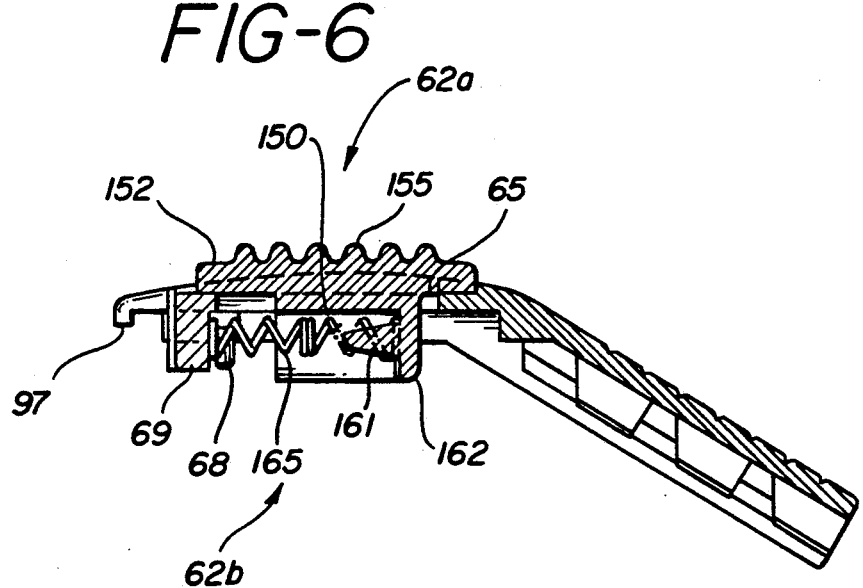
FIG. 6 is a cross-sectional side view taken along lines 6—6 of the top cover assembly of FIG. 5.

With reference to FIGS. 5 and 6, control portion 62 of top cover 60 has an exterior side 62a and an interior side 62b. Control portion 62 also comprises a window 65 passing through control portion 62 from exterior side 62a to interior side 62b. The longitudinal edges 65a and 65b of window 65 are substantially parallel to longitudinal axis L. Window 65 is adapted to slidably receive an actuator 150 and is preferably located in the central region of control portion 62.

The interior side 62b of control portion 62 comprises an abutment member 69 which extends downwardly from interior side 62b as shown in FIG. 6 and is preferably disposed adjacent the distal end of window 65. As used herein the "distal end" refers to the end of an element closest to the end of the razor mechanism which receives the cartridge and the "proximal end" refers to the opposite end, i.e. closest to the handle 20. Attachment pins 67 and 68 are provided on interior side 62b for engagement in corresponding receptacles 87 and 88 in the interior side 81b of bottom frame 80 shown in FIGS. 10 and 11. As shown in FIG. 11, receptacles 87 and 88 are preferably chamfered to aid in the insertion of attachment pins 67 and 68. While the use of pins 67, 68 and corresponding receptacles 87 and 88 is preferred, it will be appreciated by those skilled in the art that top cover 60 and bottom frame 80 may be attached by any suitable method known in the art.

As shown in FIG. 5, control portion 62 has a shape which generally flares outwardly from gripping portion 61 and has guide ends 76 and 77 at the distal end of control portion 62 for reasons discussed below. The central distal portion 78 of top cover 60 does not extend as far distally as guide ends 76 and 77. With reference to FIG. 6, a lateral guide ridge 97 extends downwardly from guide end 77 and extends in a direction generally perpendicular to the longitudinal axis L of razor mechanism 10. A similar lateral guide ridge extends from guide end 76 and is also positioned substantially perpendicular to the longitudinal axis L of razor mechanism 10.

While gripping portion 61 and control portion 62 may be disposed generally in the same plane, in a preferred embodiment of the present invention as shown in FIG. 6, gripping portion 61 is disposed at an angle to control portion 62. While the actual angle may vary, it will be appreciated by those skilled in the art that the angle is preferably in the range of about 145 to 160 degrees, and is most preferably about 150 degrees.

Also adjacent to window 65 on the interior side 62b of top cover 60 are grooved sections 71 and 72, shown by dotted lines in FIG. 5. The grooved sections 71 and 72 have outer edges 73 and 74, respectively, which extend generally parallel to the longitudinal edges 65a and 65b of window 65. As discussed below, the grooved sections 71 and 72 guide the actuator 150 as the actuator 150 is moved within window 65.

Interior portion 62b of top cover 60 has recesses 301 and 302 disposed adjacent window 65 and proximally of grooves 71 and 72, respectively. Recesses 301 and 302, along with corresponding recesses 101 and 102 of bottom frame 80, pivotally secure attachment members 200 and 200' within housing 50.

An actuator 150 is slidably disposed in window 65 of top cover 60. Actuator 150 comprises an upper gripping portion 152 having a width slightly less than the width of window 65 and a length slightly greater than the length of window 65. Upper gripping surface 152 may advantageously comprise raised protrusions 155 in order to facilitate gripping of actuator 150 by a person desiring to position a cartridge on razor mechanism 10.

Figure 12:
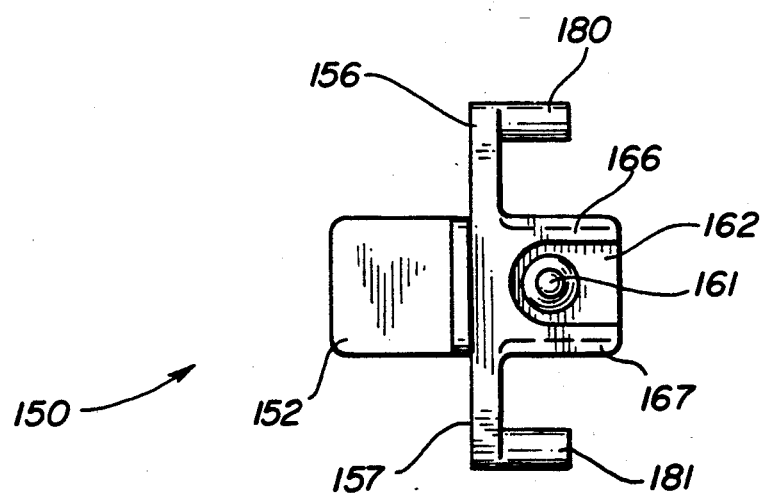
FIG. 12 is a rotated frontal view of an actuator used in one embodiment of the present invention.
Figure 13:
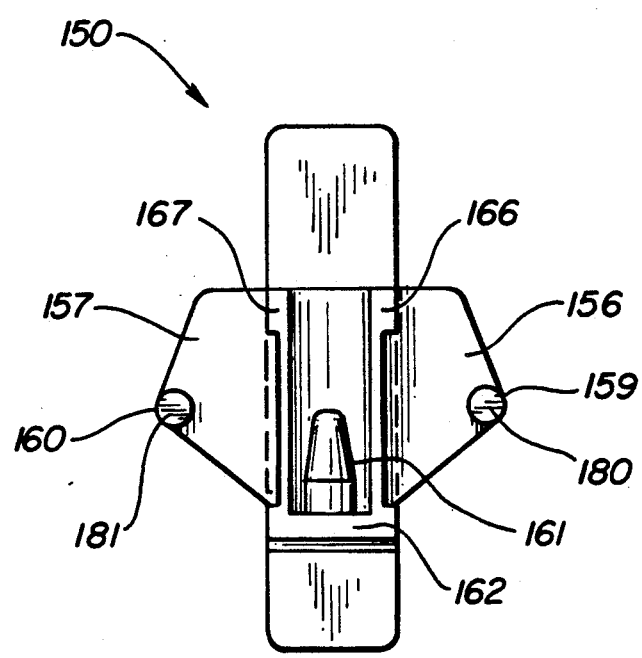
FIG. 13 is a bottom view of the actuator shown in FIG. 12.

With reference to FIGS. 12 and 13, actuator 150 also has shoulders 156 and 157 which are disposed below and to either side of upper gripping portion 152. The shoulders 156 and 157 extend outwardly such that the distance between the ends 159 and 160 of shoulders 156 and 157 respectively, is greater than the width of window 65. As illustrated in FIG. 5, shoulders 156 and 157 are designed to slidingly fit within grooves 71 and 72 of control portion 62.

As shown in FIGS. 12 and 13, actuator 150 also comprises prong members 180 and 181 which extend downwardly from shoulders 156 and 157 of actuator 150. In the illustrated embodiment, prong members 180 and 181 are positioned at the ends 159 and 160 of shoulders 156 and 157 respectively, however, it will be appreciated that alternate positioning is possible within the scope of the present invention.

Actuator 150 also has a pin member 161 best shown in FIG. 6, mounted on a support member 162 disposed below upper gripping surface 152 and toward the proximal end of actuator 150. Pin member 161 is designed to engage the proximal end of a spring 165. The distal end of spring 165 rests against abutment member 69 and thereby biases actuator 150 toward the proximal end of control portion 62. As illustrated in FIGS. 12 and 13, three sides of pin member 161 may be substantially surrounded by support member 162 and pin walls 166 and 167 in order to prevent other moving elements of the razor mechanism 10 from interfering with the action of spring 165.

From the above description, it will be appreciated that actuator 150 and spring 165 are designed for easy assembly with top cover 60. During assembly, the spring 165 is placed over the pin member 161 and gripping portion 152 of actuator 150 is inserted, distal end first, upwardly through window 65 of control portion 62. It will be appreciated that shoulders 156 and 157 prevent actuator 150 from passing entirely through window 65. When the distal end of actuator 150 has passed through window 165, the actuator is slid distally compressing spring 165, and then actuator 150 is rotated so that the proximal end of actuator 150 passes through window 165. When the actuator 150 is then released, spring 165 which is then in contact with abutment member 69, urges actuator 150 proximally in window 65. In order to facilitate the placement of actuator 150 in window 65 of control portion 62, the distance between the distal end of shoulders 156 and 157 and the proximal end of upper gripping surface 152 is less than the longitudinal length of window 65. As stated above, the longitudinal length of gripping member 152 is greater than the longitudinal length of window 65, therefore, unless actuator 150 is rotated relative to control portion 62, actuator 150 will not fall downwardly through window 65 after it has been installed. After razor mechanism 10 has been assembled, the proper positioning of actuator 150 is maintained by the proximal ends of grooves 71 and 72 which are positioned to contact the proximal ends of shoulders 156 and 157 at a location which stops the movement of actuator 150 in the proximal direction before the distal end of upper gripping surface 152 reaches the distal end of window 65.

Thus it will be appreciated by those skilled in the art that a spring 165 may be placed upon pin member 161 of actuator 150 and actuator 150 can then be easily positioned within control portion 62 of top cover 60. Spring 165 serves the dual purposes of biasing actuator 150 toward the proximal end of control portion 62 and maintaining actuator 152 within the control portion 62 during normal operation of the razor mechanism 10.

Figure 10:
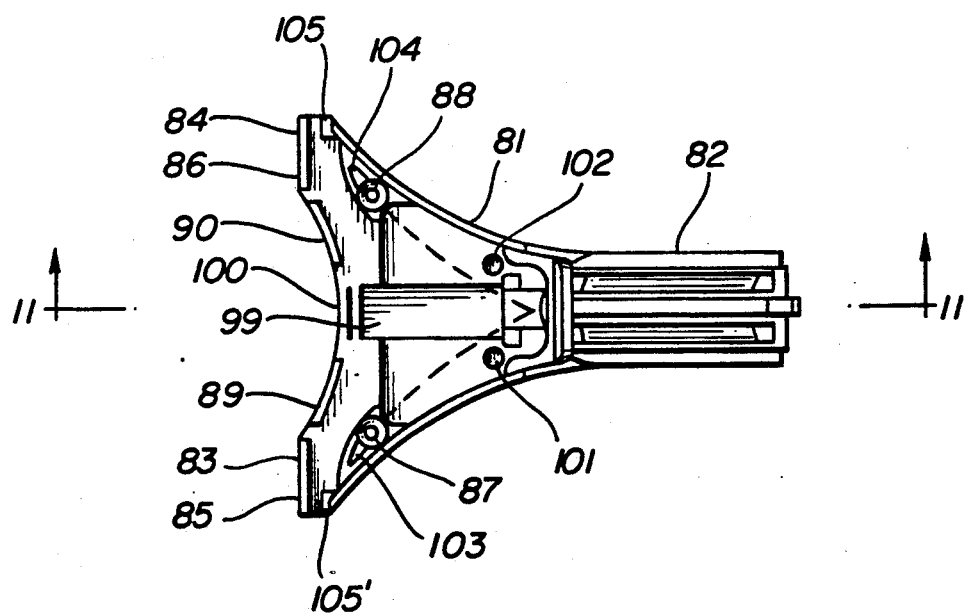
FIG. 10 is a top view of a bottom frame of one embodiment of the present invention.
Figure 11:
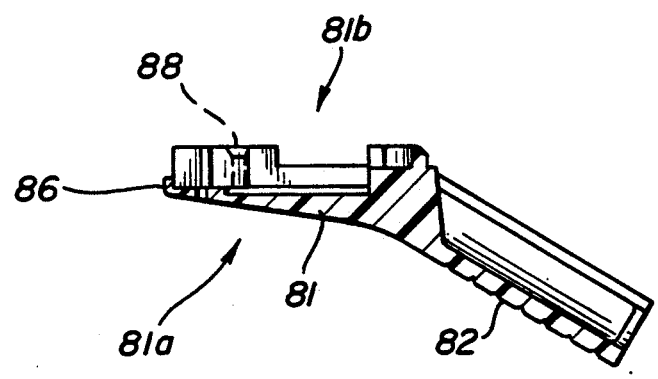
FIG. 11 is a cross-sectional side view of the bottom frame shown in FIG. 10 taken along lines 11—11.

With reference to FIGS. 10 and 11, bottom frame 80 has a control portion 81 and a stem portion 82. Control portion 81 has a bottom side 81a and an interior side 81b. Bottom frame 80 is shaped to correspond to top cover 60 such that control portion 81 also generally flares outwardly from stem portion 82. The distal end of control portion 81 has guide ends 83 and 84 and lateral guide ridges 85 and 86 which, upon assembly of the housing 50, are aligned, but not in contact with lateral guide ridges 96 and 97 of top cover 60. Thus lateral guide ridges 85 and 86 are disposed generally perpendicular to the longitudinal axis L of razor mechanism 10. The interior side 81b of bottom frame 80 also has recesses 101 and 102, which are preferably circular, in order to pivotally receive protrusions of attachment member 200 as will be described below. Interior side 81a of bottom frame 80 also has receptacles 87 and 88 which receive attachment pins 67 and 68 of top cover 60. As stated above, receptacles 87 and 88 are preferably chamfered in order to facilitate the aligning of pins 67 and 68 within receptacles 87 and 88. Attachment pins 67 and 68 of top cover 60 are securably locked within receptacles 87 and 88 of bottom frame 80 by any suitable method known in the art, such as by ultrasonic welding.

The central, distal portion 100 of bottom frame 80 does not extend as far distally as guide ends 83 and 84. Disposed between the center of distal portion 100 and guide ends 83 and 84 are lower end plates 89 and 90 which extend upwardly from the interior side 81b of bottom frame 80. Lower end plates 89 and 90, in cooperation with abutment member 69, substantially seal the distal end of housing 50 to prevent soap, hair and other debris from entering the interior of housing 50 and interfering with the movement of pieces located therein. With the exception of the distal end portions of housing 50, top cover 60 and bottom frame 80 are preferably in contact to prevent debris from entering the interior of housing 50 from other sides as well.

As shown in FIG. 10, interior guide surfaces 103 and 104 are advantageously disposed adjacent to receptacles 87 and 88, near the exterior edges of bottom frame 80 on interior side 81b. As shown in FIG. 10, interior guide surfaces 103 and 104, along with lower end plates 89 and 90 generally define a guide channel for attachment member 200.

Figure 14:
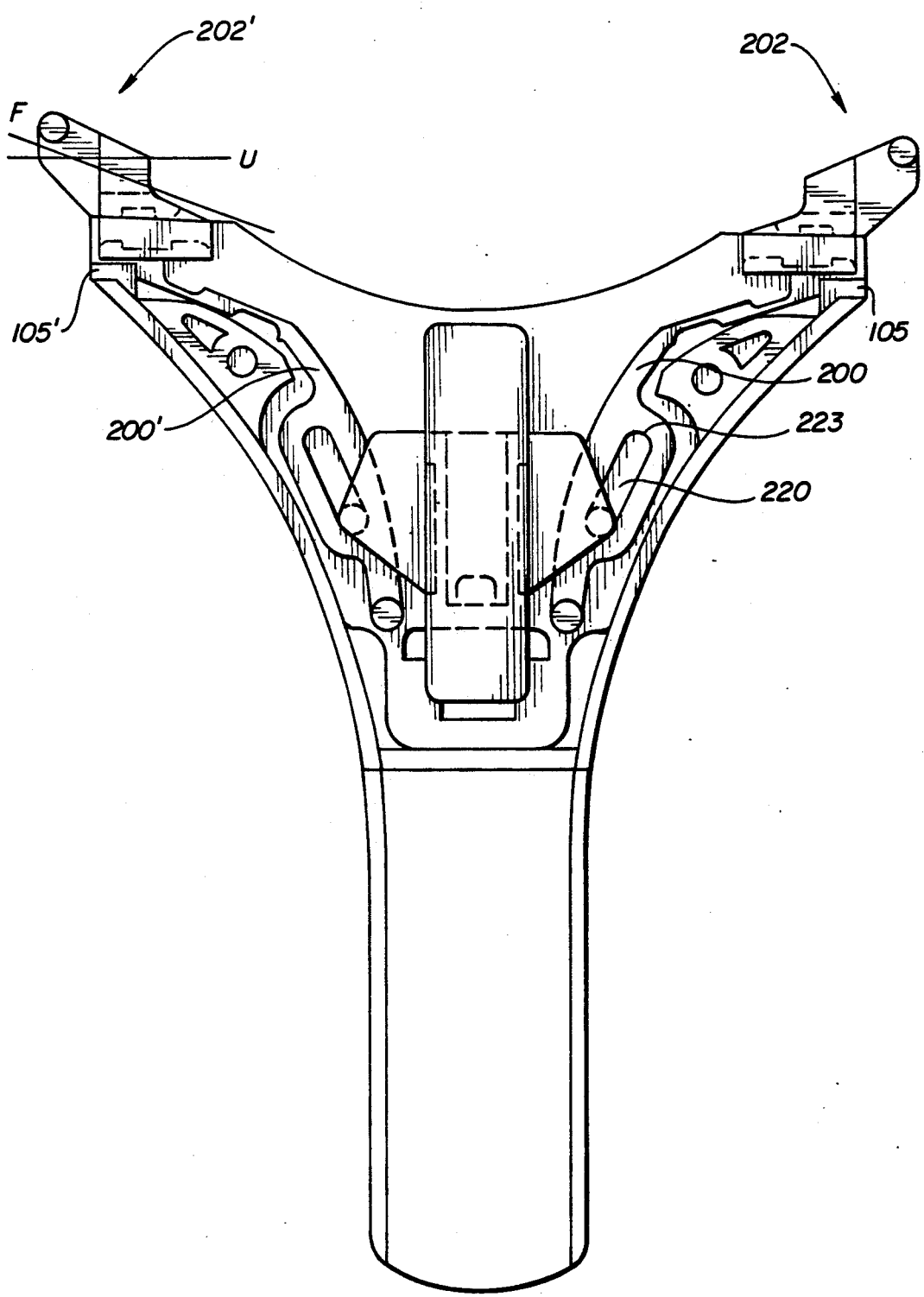
FIG. 14 is a top view of a bottom frame of the present invention showing the placement of two attachment members and an actuator.

Disposed toward the distal ends of interior guide surfaces 103 and 104, and spaced proximally from lateral guide ridges 85 and 86, are stops 105 and 105' which protrude upwardly from interior surface 81b. As best illustrated in FIG. 14, stops 105 and 105' limit the outward movement of attachment members 200 and 200'.

Bottom frame 80 also comprises a generally rectangular recess 99 having a width slightly greater than the width of support member 162. Rectangular recess 99 receives the lower end of actuator 150 defined by support member 162 and pin walls 166 and 167 in order to provide further guidance and support to the sliding movement of actuator 150 within housing 50.

Figure 7:
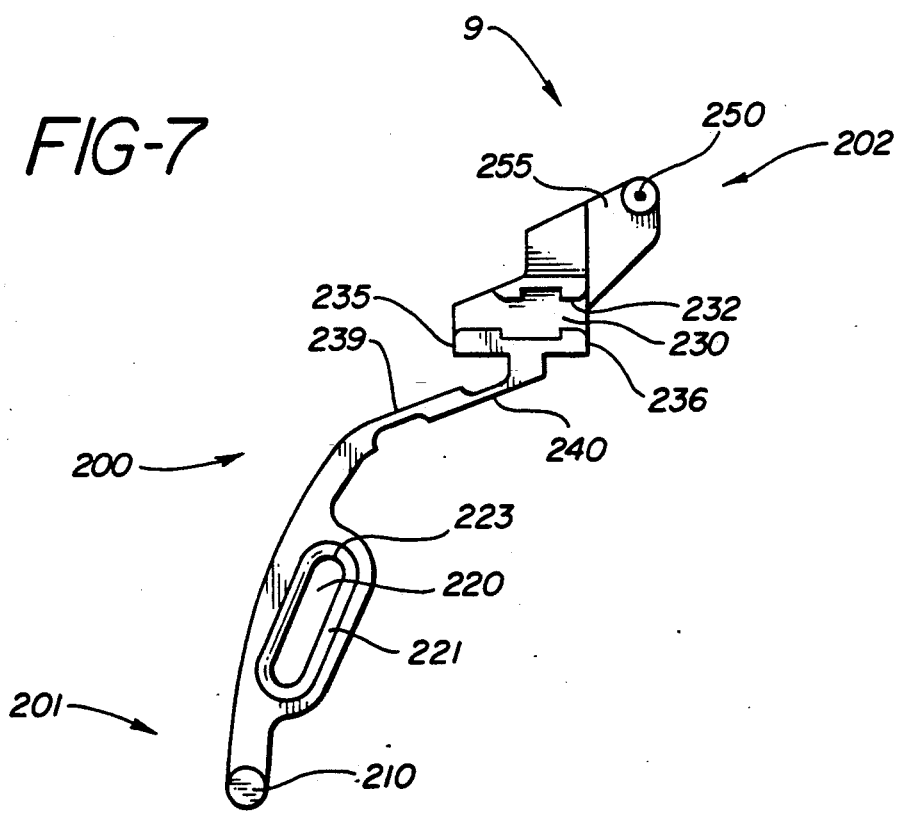
FIG. 7 is a top view of an attachment member of one embodiment of the present invention.
Figure 8:
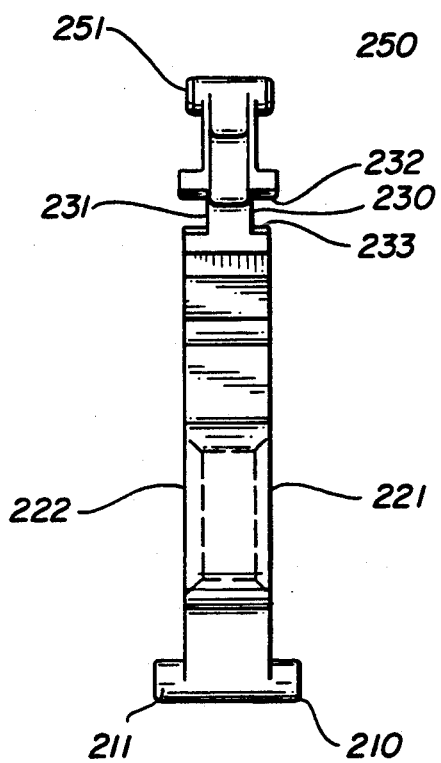
FIG. 8 is a side view of the attachment member shown in FIG. 7.
Figure 9:
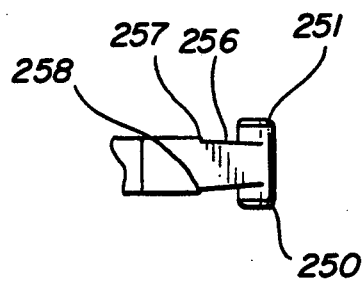
FIG. 9 is a top view of the attachment end of the attachment member illustrated in FIG. 7 from a direction illustrated by arrow 9.

With reference to FIGS. 7-9, attachment member 200 comprises a proximal end 201 and a distal end 202. As best shown in FIG. 8, proximal end 201 has protrusions 210 and 211 which are adapted to pivotally connect attachment member 200 to the recesses 301 and 101 in top cover 60 and bottom frame 80, respectively. It will be appreciated by those skilled in the art that other mechanical arrangements may be utilized in pivotally attaching the proximal end 201 of attachment member 200 within housing 50.

Attachment member 200 also comprises an actuator receptor 220 which receives a prong member 180 of actuator 150. When attachment member 200 is disposed within housing 50 and the proximal end 201 of attachment member 200 is pivotally attached in recesses 101 and 301, the actuator receptor 220 is disposed at an acute angle to the longitudinal axis L of razor mechanism 10. The acute angle, which is defined by a central line passing down the center of actuator receptor 220 and the longitudinal axis L of housing 50, is preferably between about 20 and 45 degrees when the attachment member 200 is in a relaxed position i.e. when attachment member 200 is not subject to outside forces such as those exerted by the actuator 150 or by a flexed cartridge at distal end 202. When attachment member 200 is in this "relaxed" position, prong 180 of actuator 150 is disposed at the proximal end of actuator receptor 220. While actuator receptor 220 preferably has chamfered ridges 221 and 222 on both sides and preferably passes entirely through attachment member 200, it will be appreciated by those skilled in the art that similarly positioned grooves which do not pass entirely through attachment member 200 may be utilized.

As shown in FIGS. 7 and 8 attachment member 200 has lateral guide grooves 230 and 231, spaced slightly from distal end 202 of attachment member 200 which are designed to receive lateral guide ridges 96 and 86 of housing top portion 60 and bottom frame 80, respectively. As shown in FIG. 7, lateral guide groove 230 has opposing generally parallel surfaces 232 and 233 which generally abut the lateral guide ridge 96 of top cover 60. As stated above, lateral guide ridges 85, 86, 96 and 97 are all disposed substantially perpendicular to the longitudinal axis L of razor mechanism 10. Therefore, the engagement of the lateral guide ridges within the lateral guide grooves of the attachment members 200 and 200' maintains the relative motion of the distal ends of attachment members 200 and 200' substantially perpendicular to the longitudinal axis of razor mechanism 10.

Disposed at the inner and outer edges of lateral guide groove 230 are inner stop surface 235 and outer stop surface 236. Outer stop surface 236 is aligned to contact stop 105' and thereby limits the outward movement of attachment member 200 when attachment member 200 is in a "relaxed" position. Inner stop surface 235 is aligned to contact lower end plate 90 which thereby limits the inward movement of attachment member 200 when an inwardly directed force is exerted on attachment member 200.

Since attachment member 200 is pivotally attached to housing 50 at proximal end 201, it will be appreciated by those skilled in the art that if attachment member 200 was not sufficiently flexible in the region between actuator receptor 220 and distal end 202, the distal end 202 of pivot member 200 would tend to rotate around recesses 101 and 301 instead of moving perpendicular to the longitudinal axis L of razor mechanism 10 as desired. For this reason, attachment member 200 is provided with additional flexure points 239 and 240 between actuator receptor 220 and lateral guide grooves 230 and 231. As shown in FIG. 7, flexure points 239 and 240 are preferably simply formed by using a resilient material, e.g. an acetal copolymer, when forming attachment member 200, and by keeping the thickness of attachment member 200 at these additional flexure points 239 and 240 within limits which allow the flexing but prevent failure of the attachment member 200 at these points.

Distal end 202 of attachment member 200 has protrusion members 250 and 251 mounted on neck 255. As shown in FIG. 9, which is a top view of the distal end 202 of attachment member 200 taken from the direction indicated by ARROW 9 in FIG. 7, neck 255 may be advantageously tapered having a narrower end 256 immediately adjacent protusion members 250 and 251 and gradually get wider toward the proximal end of pivot member 200 until reaching shoulders 257 and 258. The advantages provided by this tapered configuration are discussed below.

As shown in FIGS. 2 and 14, one embodiment of the present invention utilizes two attachment members 200 and 200'. The attachment members 200 and 200' are preferably arranged such that the proximal ends are pivotly connected to the interior of housing 50, actuator receptors receive prong members 180 and 181 also within the interior of housing 50, lateral guide grooves are slidingly engaged by the lateral guide ridges disposed at the distal ends of housing 50, and the distal ends of the attachment members are disposed outside of housing 50. In this manner, the attachment ends of attachment members are guided in a direction substantially perpendicular to longitudinal axis L in response to forces applied by a flexing cartridge or by actuator 150.

When actuator 150 is slid toward the distal end of housing 50, prong members 180 and 181 engage actuator receptors 220 and 220. Since prong members 180 and 181 move parallel to the longitudinal axis L of the razor handle mechanism 10, it will be appreciated from the above description and Figures that the distal end 223 of actuator receptor 220 is pulled toward the center of razor mechanism 10. Movement of actuator receptor 220 causes the lateral movement of distal end 202 of attachment member 200 which, due to the cooperation of lateral guide grooves 230, 231 within lateral guide ridges 301 and 101 of top cover 60 and bottom frame 80, is substantially perpendicular to the longitudinal axis L of razor mechanism 10. This "inward" lateral movement of the distal ends of attachment members 200, 200' enables the easy attachment and detachment of a flexible razor cartridge having a corresponding connector receptor, as discussed below.

The operation of the attachment member 200 within housing 50 is similar to a conventional 4-bar linkage mechanism. The 4-bars are generally defined by: 1) the lower portion of the attachment member extending from proximal end 201 to first flexure point 239; 2) the extension of attachment member 200 between the first flexure point 239 and the second flexure point 240; 3) the portion of attachment member 200 disposed between second flexure point 240 and lateral guide groove 230, and 4) the portion of housing 50 between the recesses 101 and 301 which receive protrusions 210 and 211 at the proximal end of attachment member 200 and the lateral guide ridges 96 and 86 which cooperate with lateral guide grooves 230 and 231 of attachment member 200.

Figure 17:
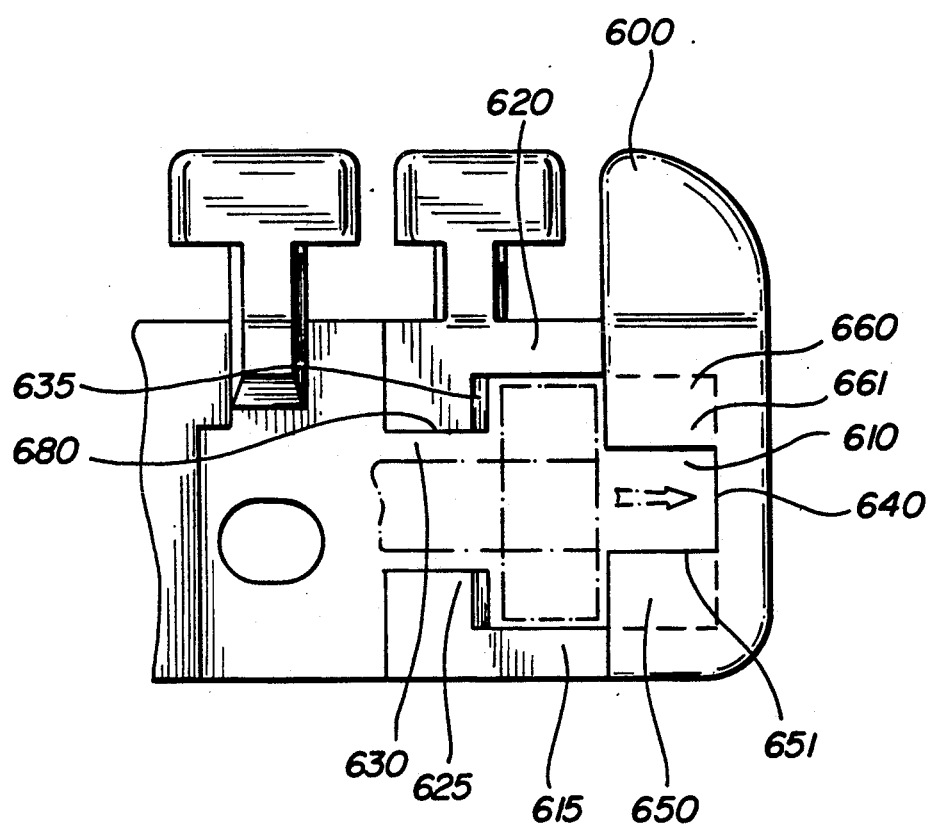
FIG. 17 is a bottom view of a portion of a flexible cartridge which may be used with the razor mechanism of the present invention.

With reference to FIG. 17 wherein a flexible cartridge 600 adapted to be supported by the razor mechanism 10 of the present invention is shown having an attachment slot 610 defined by outer sidewalls 615 and 620, inner wall 635, outer wall 640, and slot cover plates 650 and 660 having inner edges 651 and 661, respectively. Inner wall 635 has an inner wall slot 680 defined by inner side walls 625 and 630. The slot cover plates 650 and 660 cover the outer ends of the slot 610 but, as shown in FIG. 17, leave a portion of the inner end of slot 610 and the entire central region of slot 610 uncovered for the passage of neck 255 of attachment member 200.

In order to attach the flexible cartridge 600 to attachments members 200, 200', the actuator 150 is moved distally causing distal ends 202, 202' to move "inwardly", i.e. toward the center of razor mechanism 10. The protrusions members 250 and 251 are inserted into the inner end of slot 610 and then, upon release of actuator 150, are biased outwardly to the end of slot 610 covered by slot cover plates 650 and 660.

When flexible cartridge 600 is positioned on attachment members 200, 200' and flexible cartridge 600 is in a relaxed position, only an upper portion of tapered neck 255 will be disposed within slot 610 and inner wall slot 680. However, when the flexible cartridge 600 is flexed during shaving, a greater portion of neck 255 will enter and be disposed within slot 610 and inner wall slot 680. When neck 255 has the preferred tapered shape as shown in FIG. 9 (not shown in FIG. 17), it will be appreciated by those skilled in the art that the clearance between neck 255 and inner edges 651 and 661 as well as inner side walls 625 and 630 will decrease, preferably to the point of contact, when cartridge 600 is flexed during shaving. In this manner, the flexing of flexible cartridge 600 serves to form a tighter connection between cartridge 600 and razor handle 10 which is thereby less likely to rock or pivot.

The degree to which attachment members 200 and 200' may be disposed in slot 610 and inner wall slot 680 when the flexible cartridge 600 is flexed and unflexed are generally illustrated by straight lines F and U in FIG. 14 wherein the portions of attachment member 200 above lines F and U represent the portion of attachment member 200 that is disposed within slot 610 or inner wall slot 680 when cartridge 600 is in the flexed and unflexed positions, respectively.

Figure 15:
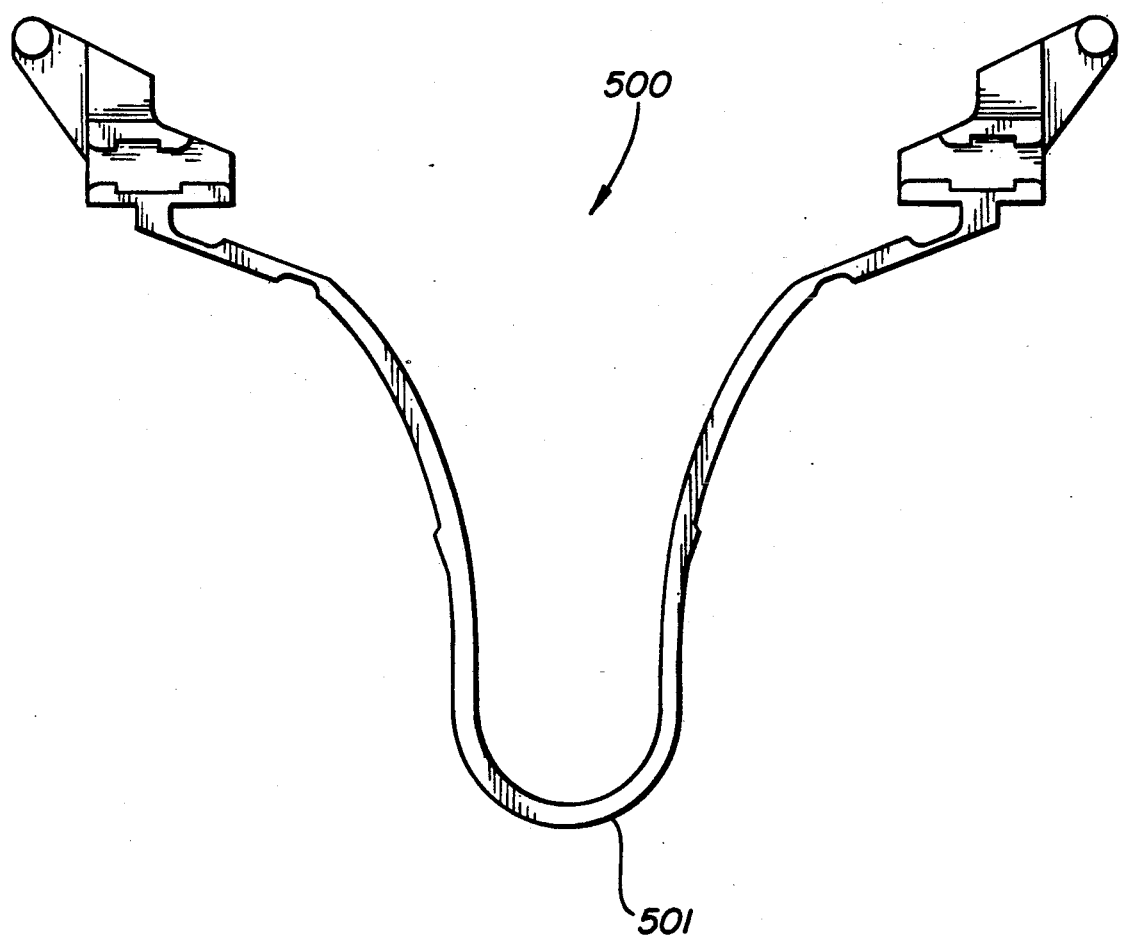
FIG. 15 is a top view of a unitary attachment member of a second embodiment of the present invention.
Figure 16:
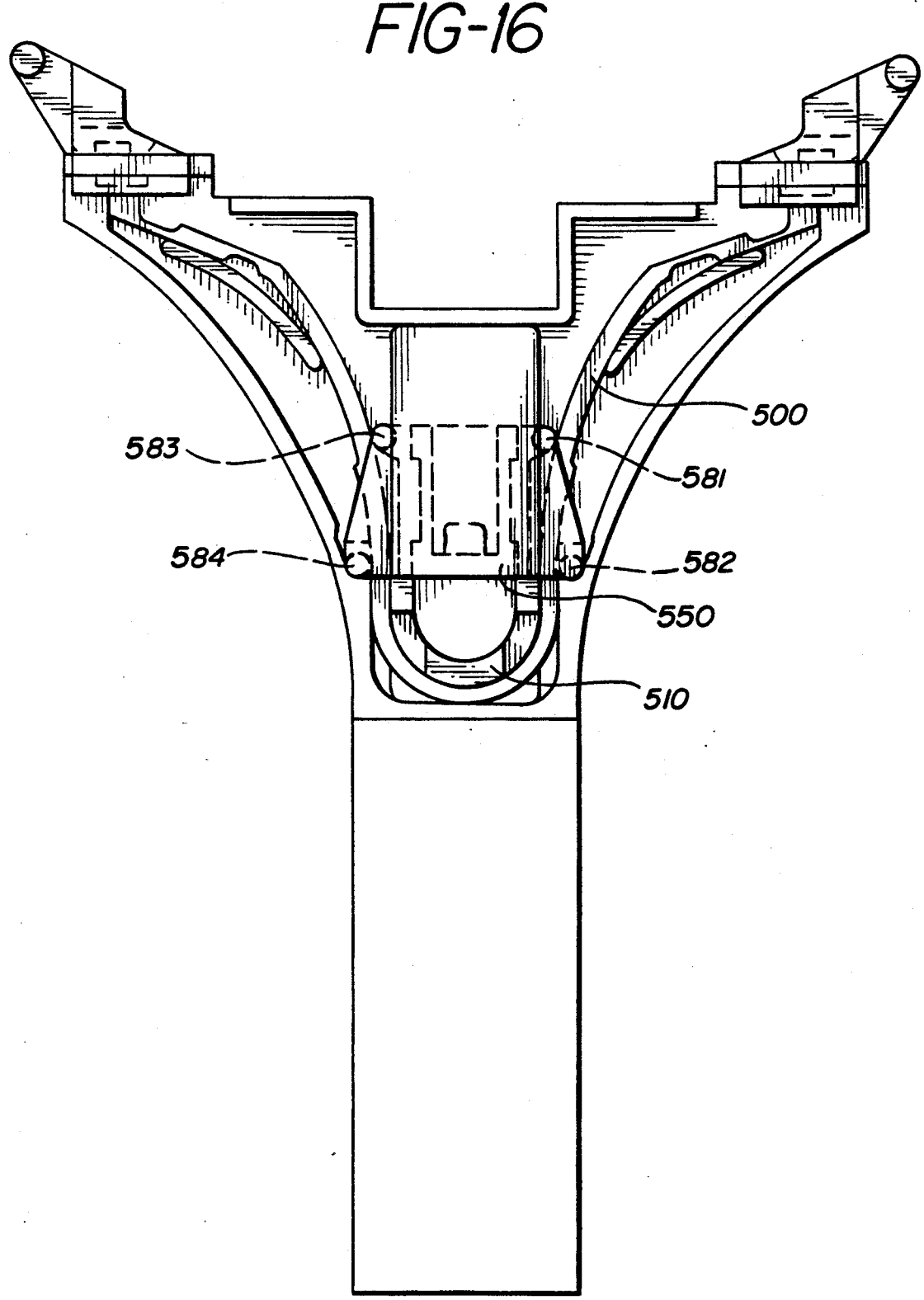
FIG. 16 is a top view of a bottom frame, actuator, and unitary attachment member used in the second embodiment of the present invention.

With reference to FIGS. 15 and 16, which illustrate an alternative embodiment of the present invention, it will be appreciated that the attachment members 200, 200' of the embodiment of the present invention discussed above can be formed as single unit. As shown in FIG. 15, unitary attachment member 500 comprises elements similar to attachment member 200 as shown in FIGS. 7-9, however, instead of having a proximal end 201 which terminates at a point which is pivotally connected within housing 50, unitary attachment member 500 comprises a flexible extension 501. As shown in FIG. 16, pivoting extension 501 is designed to be pivotally connected within housing 50 by looping around a generally semi-circular cam member 510 in a manner which allows the pivoting of each symmetrical half thereof. Additionally, unitary attachment member 500 is not provided with an actuator receptor in the same manner as attachment member 200. Instead, slidable actuator 550 is provided with two sets of prongs 581, 582 and 538, 584 which slidingly engage the sides of unitary attachment member 500 for movement in a manner identical with that discussed above. The symmetrical halves form mirror-images of each other and in all other respects perform in the same manner as attachment members 200, 200' described above.

While not necessary to the proper functioning of the present invention, the razor mechanism 10 of the present invention is preferably made such that all elements are symmetrical about the longitudinal axis L of the razor mechanism 10. It will, therefore, be appreciated that, even though the description given above for some elements has been generally provided for only one half of razor mechanism 10 and its elements, the other half, i.e. the portion on the opposite side of the longitudinal axis L preferably operate in an identical manner. It will be appreciated by those skilled in the art that the use of symmetrical pieces may lessen the expense during the manufacturing of the razor mechanism 10 of the present invention.

Figure 18:
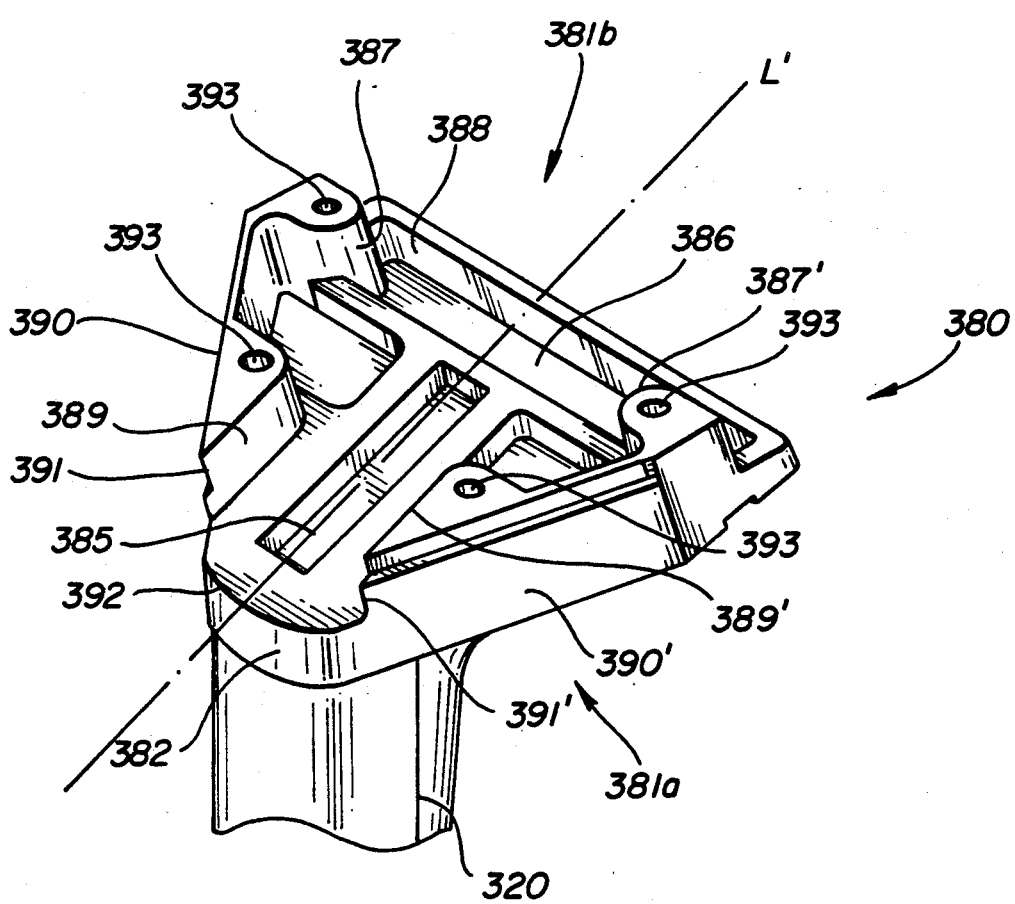
FIG. 18 is a perspective view of a bottom frame of a third embodiment of the razor mechanism of the present invention.
Figure 19:
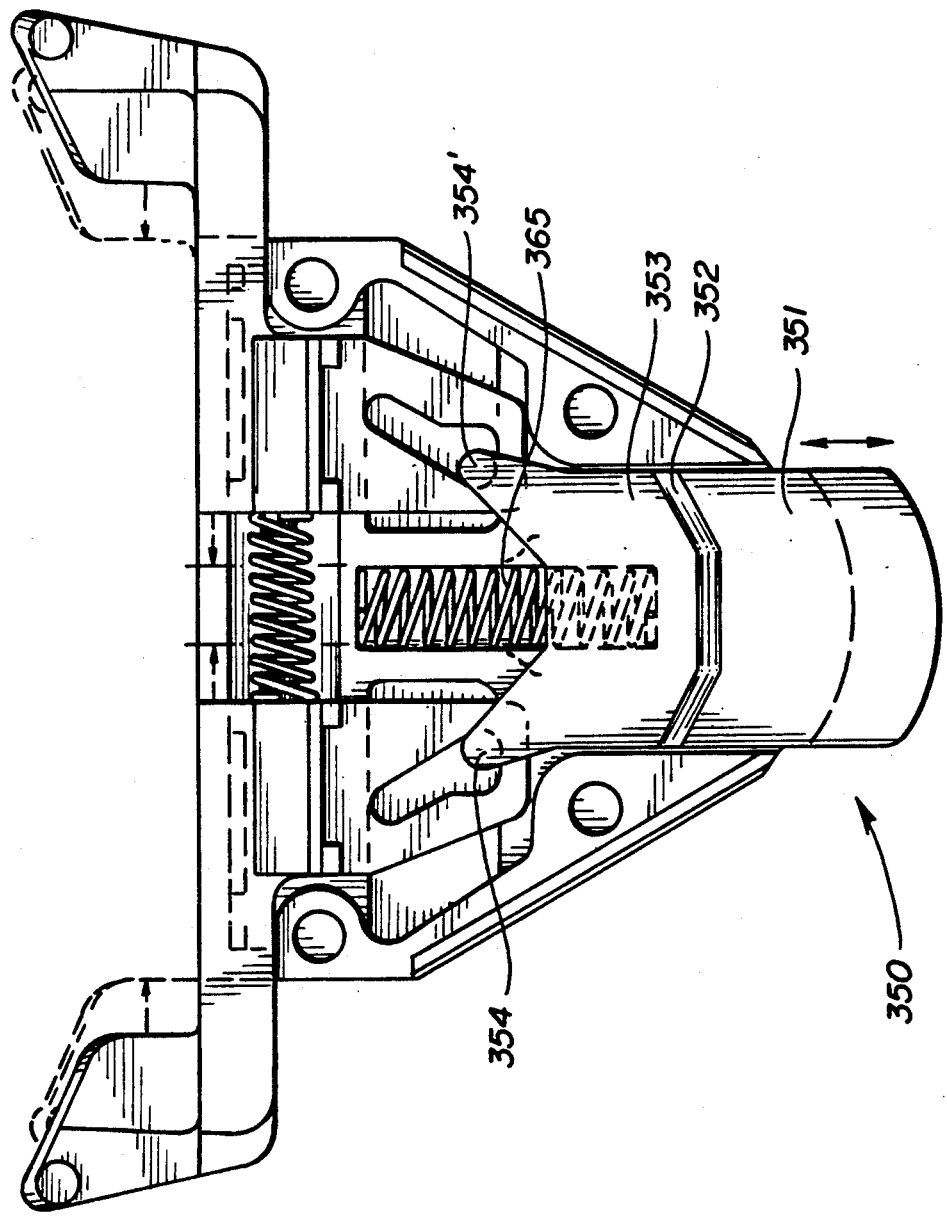
FIG. 19 is a top view of the moving elements of the third embodiment of the present invention located within the bottom frame illustrated in FIG. 18.
Figure 20:
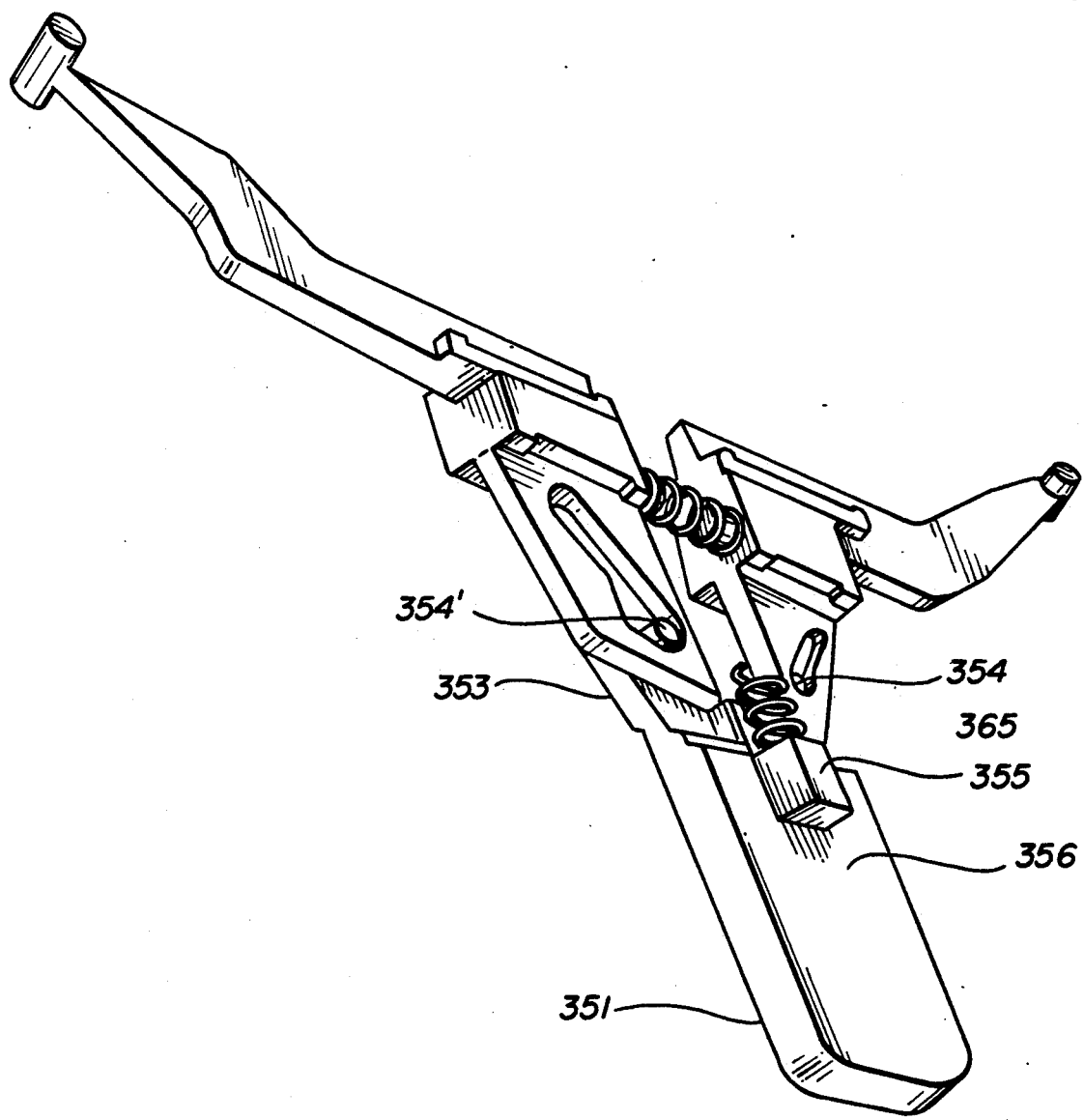
FIG. 20 is a bottom, perspective view of the moveable elements of the third embodiment of the present invention with sections removed.
Figure 21:
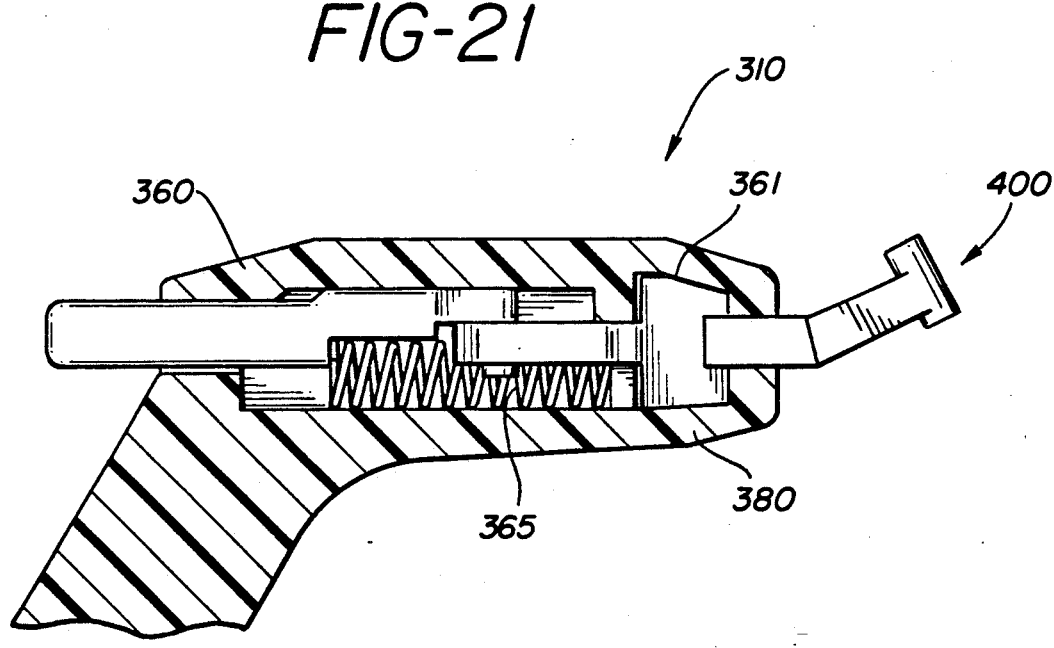
FIG. 21 is a cross-sectional side view of the third embodiment of the present invention.

In accordance with a third embodiment of the present invention, as illustrated in FIGS. 18-24, the slideable movement of attachment members in a direction substantially perpendicular to the longitudinal axis is provided using attachment members which are substantially rigid. As shown in FIGS. 18 and 19, this embodiment of the present invention comprises a bottom frame 380 designed to be disposed at the end of a handle 320 (illustrated in part). Bottom frame 380 has an interior side 381b and a generally smooth exterior side 381a. Interior 381b has a central recess 385 which extends generally along the longitudinal axis of bottom frame 380. Disposed toward the distal end of bottom frame 380 is a lateral guide recess 386 which extends in a direction substantially perpendicular to the longitudinal axis L' of bottom frame 380. Distal interior guide walls 387 and 387' are disposed at the ends of lateral guide recess 386. As discussed in further detail below, distal interior guide walls 387 and 387' act as stops to limit the outward lateral movement of attachment members 400 and 400', respectively. The distal end of lateral guide recess 386 is defined by distal end wall 388 which does not extend as far upwardly as distal interior side walls 387 and 387' as shown in FIG. 18. As shown in FIG. 21, an opening is provided in the distal end of razor mechanism 310 between top cover 360 and bottom frame 380 to allow the sliding movement of attachment members 400 and 400' therein.

Interior portion 381b of bottom frame 380 also comprises proximal interior side walls 389 and 389' which are disposed toward the proximal end of bottom frame 380 and extend generally parallel to the central recess 385 and are slightly spaced therefrom as shown in FIG. 18. Proximal interior side walls 389 and 389' provide lateral support for an actuator 350 which is slideably disposed between top cover 360 and bottom frame 380 as described below. The exterior side walls 390 and 390' of bottom frame 380 preferably flare outwardly from the proximal end 382 of bottom frame 380. As shown in FIG. 18, the exterior side walls 390 and 390' do not extend entirely around the proximal end 382 of bottom frame 380 thereby leaving a proximal channel generally defined by the proximal edges 391 and 391' of exterior side walls 390 and 390', respectively, and the proximal ridge 392 of interior portion 381b.

In order to provide secure connection with top cover 360, as shown in FIG. 21, bottom frame 380 is provided with a number of recesses 393, which may or may not be chamfered, to receive pins or other attachment members from top cover 360.

With reference to FIG. 19 which illustrates the cooperative engagement of the moving pieces of this embodiment of the razor mechanism of the present invention, an actuator 350 is shown disposed within the channel defined by proximal side edges 390 and 391 and proximal interior side walls 389 and 389' for sliding engagement therein. The top of actuator 350 has a substantially planar proximal surface 351 and a raised distal substantially planar surface 353 separated by a beveled ridge 352. The distal ends of actuator 350 are provided with downwardly extending pins 354 and 354'. The bottom side of actuator 350, as shown in FIG. 20, is provided with an abutment member 355 which extends downwardly from the bottom surface 356 of actuator 350. Actuator 350 is biased in the proximal direction by a spring member 365 wherein the proximal end of spring member 365 contacts abutment member 355 and the distal end of spring member 365 abuts the distal end of central recess 385. From FIG. 19, it will be appreciated that only a portion of spring 365 has been illustrated in FIG. 20 so as not to obscure the illustration of the other moving elements shown in FIG. 20.

Figure 22:
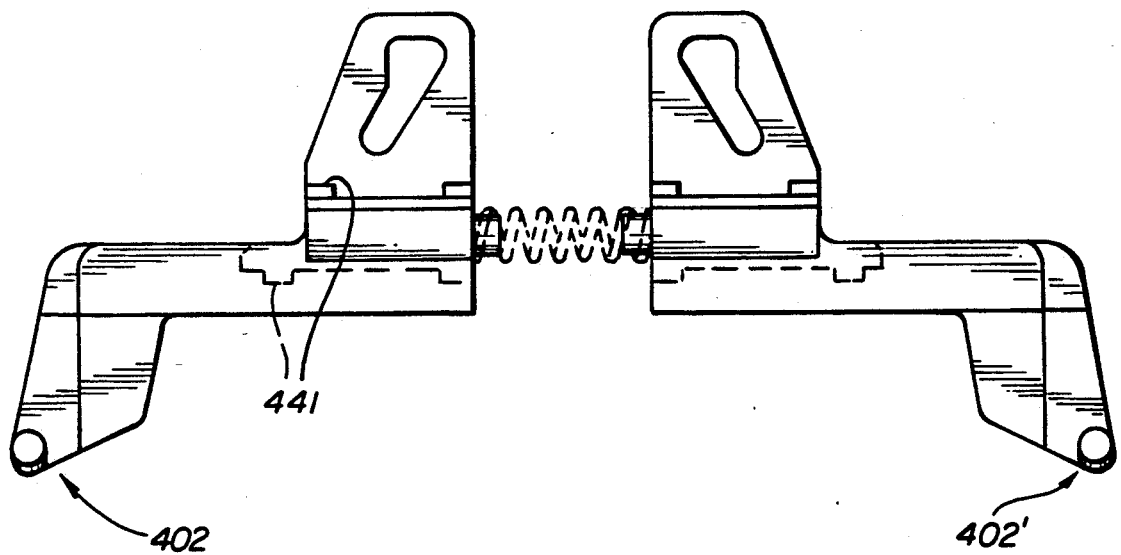
FIG. 22 is a top view of the attachment members and biasing element used in a third embodiment of the present invention.
Figure 23:
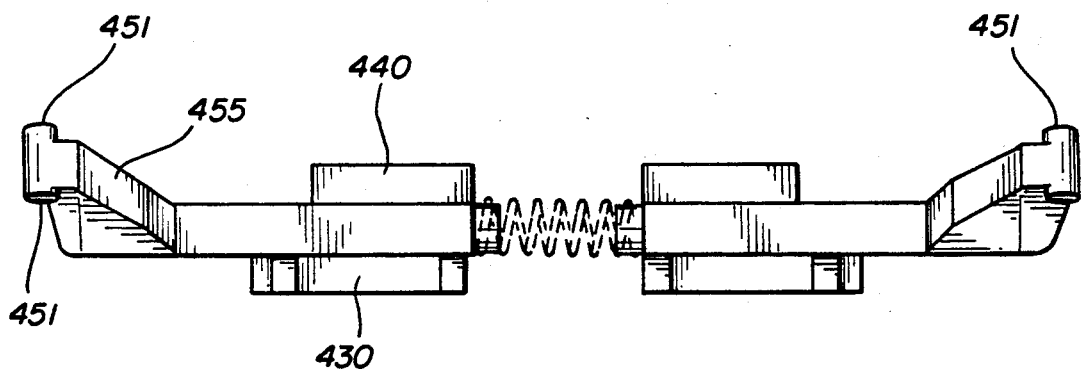
FIG. 23 is a top view of the attachment members and biasing element of a third embodiment of the present invention.
Figure 24:
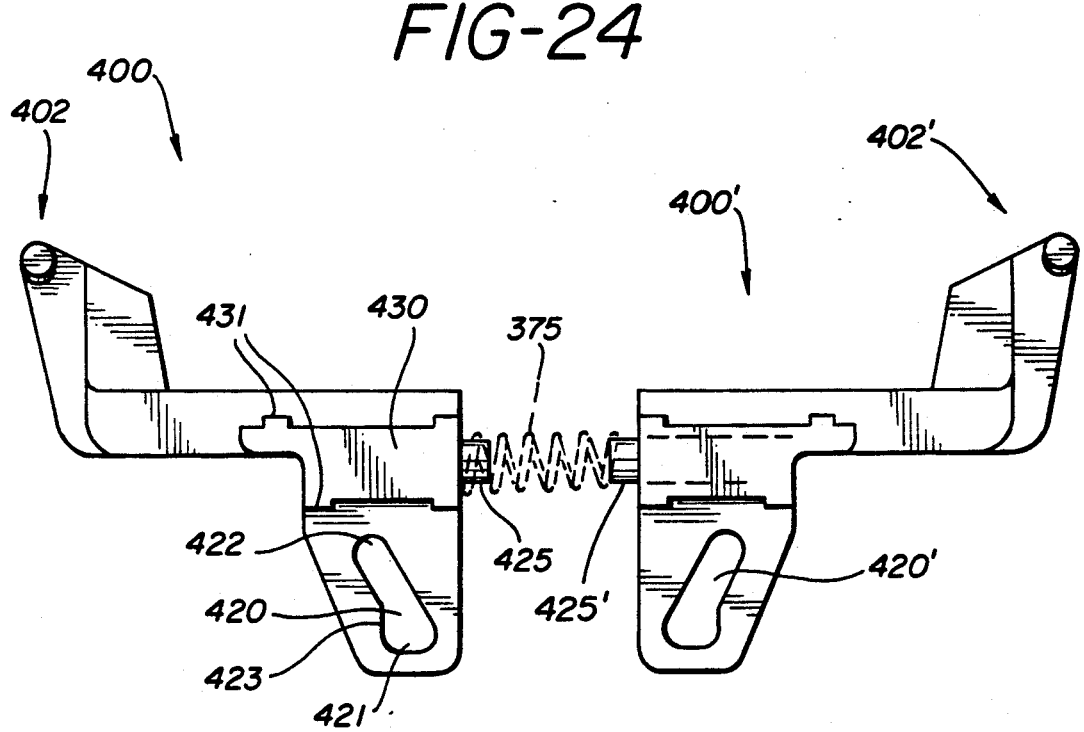
FIG. 24 is a bottom view of the attachment members and biasing element of a third embodiment of the present invention.

With reference to FIGS. 22-24, razor mechanism 300 has attachment members 400 and 400' which are separated and biased apart by spring member 375. Since the attachment members 400 and 400' are essentially mirror-images of each other, only a detailed description of attachment member 400 is provided herein. With reference to FIG. 24, attachment member 400 has an actuator receptor 420 having a proximal end 421 and a distal end 422. With reference to FIGS. 19 and 24, proximal end 421, which has an outer side wall 423 disposed substantially parallel to longitudinal axis L, is wider than prong member 354. Outer side wall 423 acts as a stop to limit the inward lateral movement of attachment member 400. The width of proximal end 421 is advantageously designed to permit the desired amount of inward lateral movement of attachment member 400 in response to the flexing of a flexible cartridge during shaving. As shown in FIG. 19, actuator receptor 420, when assembled within bottom frame 380, is disposed at an angle to longitudinal axis L'. It will be appreciated that when the distal end 422 of actuator receptor 420 is disposed further from central longitudinal axis L than proximal end 421, attachment member 400 can be moved further inwardly, i.e. toward longitudinal axis L, in response to actuation of actuator 350 than in response to forces exerted on attachment member 400 by a flexing cartridge.

The bottom side of attachment member 400, illustrated in the bottom view shown in FIG. 24, is provided with a lateral guide member 430 which protrudes from the bottom of attachment member 400. Lateral guide member 430 may be provided with lateral guide surfaces 431 which are adapted to be slidingly received within lateral guide recess 386 with a minimal amount of clearance in order to guide the movement of attachment member 400 in a direction substantially perpendicular to the longitudinal axis L' of bottom frame 380. The interior side of attachment member 400 is advantageously provided with a pin member 425 which is adapted to receive one end of spring member 375. A corresponding pin member 425' receives the other end of spring member 375 in a manner which thereby provides an outward, resilient bias to attachment members 400 and 400'.

As illustrated in FIGS. 22 and 23, the top surface of attachment member 400 may be provided with an upper guide protrusion 440 which is provided with upper guide surfaces 441. The upper guide protrusion 440 is adapted to be slidably received with a minimal amount of clearance within a corresponding lateral guide groove 361 in top cover 360 as shown in FIG. 21. It will be appreciated by those skilled in the art that lateral guide surfaces 441 together with lateral guide groove 361 provide added support to the sliding movement of attachment member 400 in a direction substantially perpendicular to longitudinal axis L'.

Attachment member 400 is also provided with an attachment end 402 having a neck member 455 and attachment protrusions 451 designed to engage a flexible cartridge such as the type shown in FIG. 17. As illustrated in FIG. 23, attachment neck 455 may be disposed in a plane which is not parallel to longitudinal axis L'.

FIG. 21 is a cross-sectional side view of the assembled razor mechanism 310 of the present invention showing bottom frame 380, top cover 360, attachment member 400, and spring member 365.

From the above description, it will be appreciated by those skilled in the art that when the razor mechanism 310 of this embodiment of the present invention is assembled, attachment members 400 and 400' are generally biased outwardly by spring member 375, but are free to move in a direction substantially perpendicular to longitudinal axis L', in response to inwardly directed forces exerted by a flexible cartridge during shaving.

It will also be appreciated that a razor cartridge may be easily assembled upon the attachment ends 402 and 402' of attachment member 400 and 400' by first pushing actuator 350 in a distal direction wherein pins 354 and 354' in cooperation with actuator receptors 420 and 420' exert an inwardly directed force on attachment members 400 and 400'. Attachment ends 402 and 402' may then be inserted into connector recesses of a flexible cartridge, such as the type partially illustrated in FIG. 17. For example, the attachment protrusions 451 and 451' may be inserted into the inner end slot 610 (as shown in FIG. 17) and then, upon release of actuator 350, are biased outwardly to the end of slot 610 covered by slot cover plates 650 and 660. In this manner, a flexible cartridge does not have to be bent or otherwise handled with a forceful grip in order to attach the flexible cartridge onto razor mechanism 310.

It will be appreciated by those skilled in the art that the neck portion 455 of attachment member 400 may also be tapered in a manner similar to the neck member 255 of attachment member 200. Such a tapered configuration provides a more secure connection between the attachment member and the respective connector slot of the cartridge.

As used herein, the term "flexible" includes shaving blade assemblies in which the amount of bending thereof in response to normal human shaving forces is sufficient to substantially conform the blade assembly to many of the non-planar surfaces shaved, and to exclude the relatively rigid prior art shaving blade assemblies which in response to those same shaving forces do not bend or yield more than an insignificant amount insofar as contour-following characteristics are concerned.

It will be appreciated by those skilled in the art that a typical razor cartridge is on the order of about 1.6 inch long. The present invention is designed to support flexible razor cartridges which may be deflected up to about 0.20 inches and preferably about 0.120 inches at their midpoints. It will be appreciated that this deflection is measured as the distance between the midpoint of the razor cartridge when the razor cartridge is in a "relaxed", generally straight configuration and when the cartridge is flexed as much as the razor mechanism of the present invention will permit during shaving. The attachment members of the present invention are designed to each move a maximum distance of about 0.040 inches, and preferably to move a distance of about 0.015 inches. The attachment members preferably move about 0.015 inches when the midpoint of the flexible cartridge is deflected about 0.120 inches. The attachment members preferably move about 0.050 inches in response to forces between about 60 and 150 grams and most preferably about 120 grams.

What is claimed is:

1. A razor mechanism for use with a flexible cartridge comprising:
 a housing having a substantially enclosed interior portion, a distal end, a proximal end and a central longitudinal axis extending from said distal end to said proximal end;

an actuator slidably connected to said housing for movement in a direction substantially parallel to said longitudinal axis, said actuator comprising at least one prong member;

an attachment member having a pivoting end and an attachment end, wherein said pivoting end is pivotally connected to said housing within said interior portion, and at least a portion of said attachment member is disposed within said interior portion, said attachment end is moveable in response to flexing of said flexible cartridge during shaving;

said attachment member further comprising at least one flexure point disposed between said attachment end and said pivoting end; and wherein said actuator engages said attachment member such that said attachment end moves in a direction substantially perpendicular to said longitudinal axis in response to the movement of said actuator.

2. A razor mechanism according to claim 1 wherein said razor mechanism comprises two attachment members disposed on opposite sides of said central longitudinal axis.

3. A razor mechanism according to claim 1 wherein said attachment member has at least one lateral guide groove;

said housing has at least one lateral guide edge disposed substantially perpendicular to said longitudinal axis; and wherein said lateral guide groove engages said lateral guide edge to guide said attachment end in a direction substantially perpendicular to said longitudinal axis.

4. A razor mechanism according to claim 1 wherein said attachment member comprises at least two flexure points.

5. A razor mechanism according to claim 1 wherein said attachment member comprises an actuator receptor which slidingly receives said prong member.

6. A razor mechanism according to claim 5 wherein said actuator receptor is normally disposed at an obtuse angle with said longitudinal axis.

7. A razor mechanism according to claim 1 wherein said actuator is biased toward said proximal end of said housing.

8. A razor mechanism according to claim 7 wherein said actuator is biased by a spring.

9. A razor mechanism according to claim 1 wherein said attachment end comprises a neck member having a distal end and a proximal end, and wherein said distal end of said neck member is narrower than said proximal end of said neck member.

10. A razor mechanism according to claim 9 wherein said neck member tapers gradually from said distal end to said proximal end.

11. A razor mechanism comprising:

a base member having a central longitudinal axis;

means for attaching a flexible cartridge to said razor mechanism such that said cartridge is disposed substantially perpendicular to said longitudinal axis, wherein said attaching means is moveably connected to said base member;

means for moving said attaching means such that upon movement of said moving means said attaching means moves in a direction perpendicular to said longitudinal axis; and wherein said attaching means is also moveable in a direction substantially perpendicular to said longitudinal axis in response to flexing of said flexible cartridge during shaving.

12. A razor mechanism according to claim 11 wherein said attaching means is pivotally connected to said base member and said attaching means has at least one flexure area which permits the bending of said attaching means.

13. A razor mechanism according to claim 11 wherein said attaching means comprises more than one attachment member.

14. A razor mechanism according to claim 11 wherein said moving means is a slideable actuator having at least one prong member which slidingly engages said attaching means.

15. A razor mechanism according to claim 14 wherein said razor mechanism has a distal end and a proximal end and wherein said slidable actuator is biased toward said proximal end.

16. A razor mechanism according to claim 11 wherein said attaching means comprises at least one substantially rigid attachment member slidably disposed on said base member.

17. A razor mechanism according to claim 16 wherein said attaching means comprises two substantially rigid attachment members which are biased apart by a spring member.

18. A razor having a central longitudinal axis comprising:

a flexible cartridge;

a body comprising a head; and means for supporting said flexible cartridge on said razor, said supporting means being moveable in a direction substantially perpendicular to said longitudinal axis of said razor and independently of said head in response to the flexing of said flexible cartridge during shaving.

19. A razor mechanism for use with a flexible cartridge comprising:

a housing having a distal end, a proximal end, a central longitudinal axis extending from said distal end to said proximal end, a substantially enclosed interior region, and at least one guide ridge disposed substantially perpendicular to said longitudinal axis;

at least one attachment member disposed at least partially within said housing, said attachment member having a proximal end pivotally connected to said housing in said interior region and at least one lateral groove which slidingly engages said guide ridge;

said attachment member further comprising an attachment end which is moveable in a direction substantially perpendicular to said longitudinal axis of said razor mechanism in response to the flexing of said flexible cartridge during shaving;

an actuator slidably connected to said housing along said longitudinal axis and in moveable engagement with said attachment member; and said actuator is biased toward the proximal end of said housing and wherein the movement of said actuator toward the distal end of said housing moves said attachment end in a direction substantially perpendicular to said longitudinal axis.

* * * * *